US012655921B2

(12) United States Patent
Wang et al.

(10) Patent No.: US 12,655,921 B2
(45) Date of Patent: Jun. 16, 2026

(54) EXPLOSION-PROOF SPIRAL EXHAUST PRESSURE RELIEF DEVICE FOR MINE

(71) Applicant: WUJIANG TIANLONG ELECTRONIC MACHINERY EQPT CO., LTD., Suzhou (CN)

(72) Inventors: Junhua Wang, Suzhou (CN); Rui Chen, Suzhou (CN); Yandong Hou, Suzhou (CN)

(73) Assignee: Wujiang Tianlong Electronic Machinery Eqpt Co., Ltd.

( * ) Notice: Subject to any disclaimer, the term of this patent is extended or adjusted under 35 U.S.C. 154(b) by 234 days.

(21) Appl. No.: 18/557,527

(22) PCT Filed: Jun. 29, 2023

(86) PCT No.: PCT/CN2023/103832
§ 371 (c)(1),
(2) Date: Oct. 26, 2023

(87) PCT Pub. No.: WO2024/051309
PCT Pub. Date: Mar. 14, 2024

(65) Prior Publication Data
US 2025/0314330 A1      Oct. 9, 2025

(30) Foreign Application Priority Data
Sep. 9, 2022    (CN) .......................... 202211104375.3

(51) Int. Cl.
*F16K 47/12*      (2006.01)
*F16K 24/04*      (2006.01)

(52) U.S. Cl.
CPC .............. *F16K 47/12* (2013.01); *F16K 24/04* (2013.01)

(58) Field of Classification Search
CPC .......... F16K 47/06; F16K 47/12; F16K 24/04; H01M 50/308; H01M 50/35
See application file for complete search history.

(56) References Cited

U.S. PATENT DOCUMENTS 1,901,633 A * 3/1933 Clemmons .............. F16K 47/12
137/445
2,273,737 A * 2/1942 Snyder ............... B60K 15/0406
137/39
(Continued)

FOREIGN PATENT DOCUMENTS

CA          665233 A      6/1963
CN     104934561 A      9/2015
(Continued)

OTHER PUBLICATIONS

Machine English translation of DE-102017124931-A1 (Year: 2025).*
International Search Report of International Application No. PCT/US2023/103832, mailed on Sep. 27, 2023. 5 pages.

*Primary Examiner* — Hailey K. Do
(74) *Attorney, Agent, or Firm* — Victor Cardona, Esq; Heslin Rothenberg Farley & Mesiti P.C.

(57) ABSTRACT

An explosion-proof spiral exhaust pressure relief device for mine is provided, relating to the technical field of explosion-proof pressure relief devices. A main structure of the explosion-proof spiral exhaust pressure relief device for mine includes an explosion-proof pressure relief housing and a first explosion-proof pressure relief inner core. An exhaust cavity is arranged inside the explosion-proof pressure relief housing in an axial direction. The exhaust cavity is open at one end of the explosion-proof pressure relief housing, and the other end of the explosion-proof pressure relief housing is provided with pressure relief holes communicating with the exhaust cavity. The first explosion-proof pressure relief inner core is arranged in the exhaust cavity. An outer wall of
(Continued)

the first explosion-proof pressure relief inner core is provided with at least one explosion-proof spiral pressure relief channel.

7 Claims, 5 Drawing Sheets

(56)                   References Cited

U.S. PATENT DOCUMENTS

| | | | | | |
|---|---|---|---|---|---|
| 3,798,073 | A | * | 3/1974 | Karpal ................ | H01M 50/308 |
| | | | | | 429/89 |
| 11,306,833 | B2 | * | 4/2022 | Burke ..................... | F16K 17/02 |

FOREIGN PATENT DOCUMENTS

| | | | | | |
|---|---|---|---|---|---|
| CN | 207617066 | U | | 7/2018 | |
| CN | 213511083 | U | | 6/2021 | |
| CN | 114033893 | A | | 2/2022 | |
| CN | 216980342 | U | | 7/2022 | |
| CN | 115929963 | A | | 4/2023 | |
| CN | 219082355 | U | | 5/2023 | |
| DE | 102017124931 | A1 | * | 4/2019 | ........... G05D 7/0133 |

* cited by examiner

EXPLOSION-PROOF SPIRAL EXHAUST PRESSURE RELIEF DEVICE FOR MINE

CROSS-REFERENCE TO RELATED APPLICATIONS

This application is a national stage filing under Section 371 of International Application No. PCT/CN2023/103832, filed Jun. 29, 2023, which claims priority from Chinese Patent Application No. 202211104375.3 filed on Sep. 9, 2022, the entire disclosures of which are incorporated herein by reference.

TECHNICAL FIELD

The present disclosure relates to the technical field of explosion-proof pressure relief devices, in particular to an explosion-proof spiral exhaust pressure relief device for mine.

BACKGROUND

Multiple lithium-ion batteries are placed in a flameproof cavity of an explosion-proof lithium-ion battery power supply for coal mines. Due to the fact that a large amount of gas is generated by lithium batteries in an abnormal state, if these gases cannot be quickly and effectively exhausted from the flameproof cavity, it will lead to an increase in the pressure inside the flameproof cavity and even an explosion accident. Therefore, it is usually necessary to provide an explosion-proof pressure relief device in the flameproof cavity.

The principle similar to a safety valve is adopted for one type of existing explosion-proof pressure relief device, exhaust pressure relief is conducted when the pressure reaches a preset value. This type of explosion-proof pressure relief device is small in pressure relief flow, and thus is difficult to meet the explosion-proof pressure relief requirements. A diaphragm structure is adopted for another type of existing explosion-proof pressure relief device. The diaphragm structure is fractured when the pressure is high enough, and thus pressure relief is conducted through the damaged diaphragm. This type of explosion-proof pressure relief device needs to replace the diaphragm, and an exhaust port is too large after the diaphragm is damaged. At this time, the explosion-proof pressure relief device does not meet the explosion-proof design requirements, and is easy to cause explosion.

Therefore, there is an urgent need for an exhaust pressure relief device, which not only can meet the explosion-proof pressure relief requirements, but also can meet the explosion-proof design requirements in the process of exhaust pressure relief.

SUMMARY

In order to solve the above technical problems, an explosion-proof spiral exhaust pressure relief device for mine is provided, which not only can meet the explosion-proof pressure relief requirements, but also can meet the explosion-proof design requirements in the process of exhaust pressure relief.

In order to achieve the above objective, the present disclosure provides the following solution.

An explosion-proof spiral exhaust pressure relief device for mine provided by the present disclosure includes an explosion-proof pressure relief housing, and a first explosion-proof pressure relief inner core. An exhaust cavity is arranged inside the explosion-proof pressure relief housing in an axial direction, the exhaust cavity is open at one end of the explosion-proof pressure relief housing, and an other end of the explosion-proof pressure relief housing is provided with pressure relief holes communicating with the exhaust cavity. The first explosion-proof pressure relief inner core is arranged in the exhaust cavity; and an outer wall of the first explosion-proof pressure relief inner core is provided with at least one explosion-proof spiral pressure relief channel.

Alternatively, at least one second explosion-proof pressure relief inner core is also arranged between the explosion-proof pressure relief housing and the first explosion-proof pressure relief inner core; the second explosion-proof pressure relief inner core is of a rod-shaped structure, and an outer wall of the second explosion-proof pressure relief inner core is provided with at least one explosion-proof spiral pressure relief channel; an accommodating cavity is arranged inside the second explosion-proof pressure relief inner core, and the accommodating cavity is configured for accommodating the first explosion-proof pressure relief inner core or the second explosion-proof pressure relief inner core.

Alternatively, one end, facing an inner bottom of the exhaust cavity, of the first explosion-proof pressure relief inner core is provided with a first circumferential pressure relief groove.

Alternatively, a gap between an outer diameter of the explosion-proof spiral pressure relief channel on the outer wall of the first explosion-proof pressure relief inner core and an inner diameter of the exhaust cavity is from 0.03 mm to 0.6 mm.

Alternatively, one end, facing the inner bottom of the exhaust cavity, of the second explosion-proof pressure relief inner core is provided with a second circumferential pressure relief groove, and the accommodating cavity communicates with the second circumferential pressure relief groove.

Alternatively, a gap between an outer diameter of the explosion-proof spiral pressure relief channel on the outer wall of the first explosion-proof pressure relief inner core and an inner diameter of the accommodating cavity is from 0.03 mm to 0.6 mm.

Alternatively, for every two adjacent second explosion-proof pressure relief inner cores, a gap between an outer diameter of the explosion-proof spiral pressure relief channel on an outer wall of the second explosion-proof pressure relief inner core on an inner side and an inner diameter of an accommodating cavity of the second explosion-proof pressure relief inner core on an outer side is from 0.03 mm to 0.6 mm.

Alternatively, an end part and a side wall of the other end of the explosion-proof pressure relief housing are both provided with the pressure relief holes.

Alternatively, an outer wall of the end of the explosion-proof pressure relief housing is provided with an external thread, and the external thread is configured to be connected to a flameproof cavity of a battery power supply.

Alternatively, a length of the explosion-proof spiral pressure relief channel is not less than 25 mm.

Compared with the prior art, the present disclosure has the following technical effects.

A main structure of the explosion-proof spiral exhaust pressure relief device for mine includes an explosion-proof pressure relief housing and a first explosion-proof pressure relief inner core. A second explosion-proof pressure relief inner core may also be arranged between the explosion-proof pressure relief housing and the first explosion-proof pressure relief inner core, and the cross-sectional area of the pressure relief channel is increased without changing a flameproof gap. Actual use requirements can be met by changing the stages of the explosion-proof pressure relief inner cores, and the explosion-proof design requirements can be met while the exhaust pressure relief is achieved.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

Reference signs description: 1 explosion-proof pressure relief housing; 2 first explosion-proof pressure relief inner core; 3 second explosion-proof pressure relief inner core; 4 explosion-proof spiral pressure relief channel; 5 first circumferential pressure relief groove; 6 pressure relief hole; 7 piping lock; 8 second circumferential pressure relief groove; 31 first-stage second explosion-proof pressure relief inner core; 32 second-stage second explosion-proof pressure relief inner core.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Embodiment I

Figure 1:
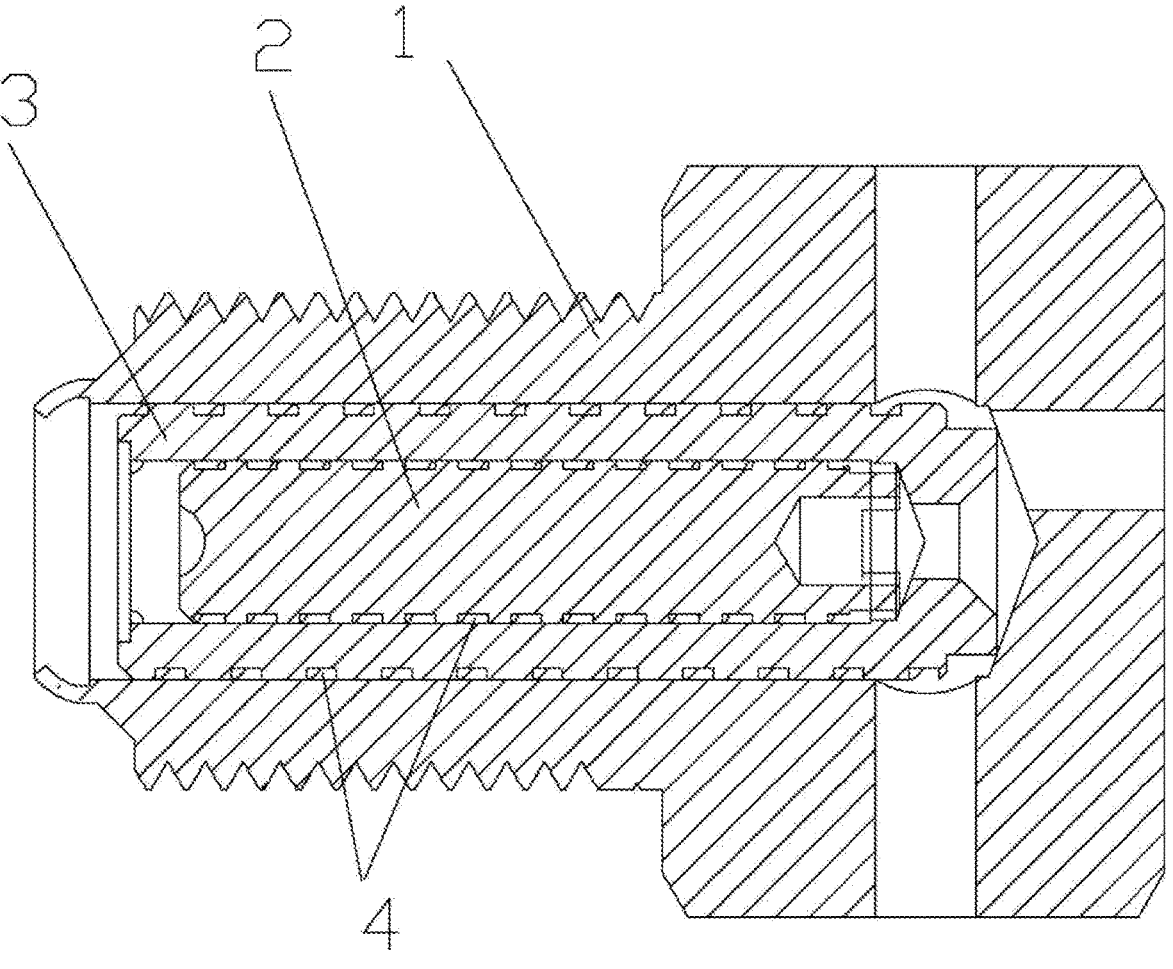
FIG. 1 is a structural schematic diagram of an explosion-proof spiral pressure relief device for mine in accordance with an embodiment of the present disclosure.
Figure 2:
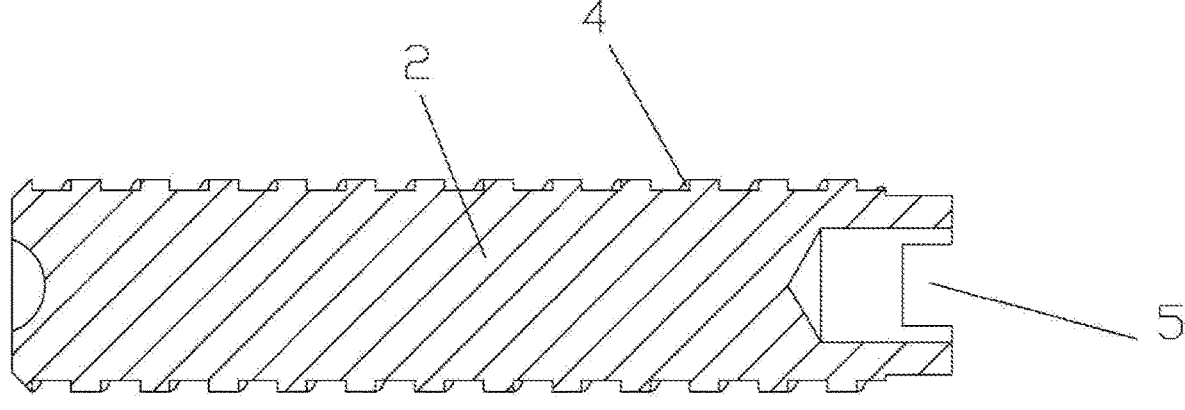
FIG. 2 is a schematic diagram of a sectional structure of a first explosion-proof pressure relief inner core in the explosion-proof spiral pressure relief device for mine in accordance with an embodiment of the present disclosure.
Figure 3:
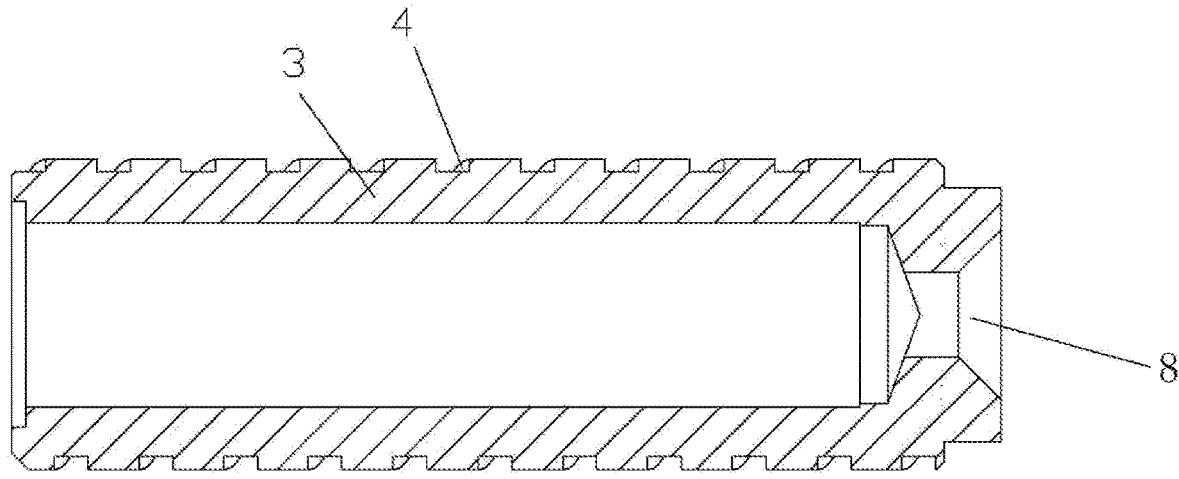
FIG. 3 is a schematic diagram of a sectional structure of a second explosion-proof pressure relief inner core in the explosion-proof spiral pressure relief device for mine in accordance with an embodiment of the present disclosure.
Figure 4:
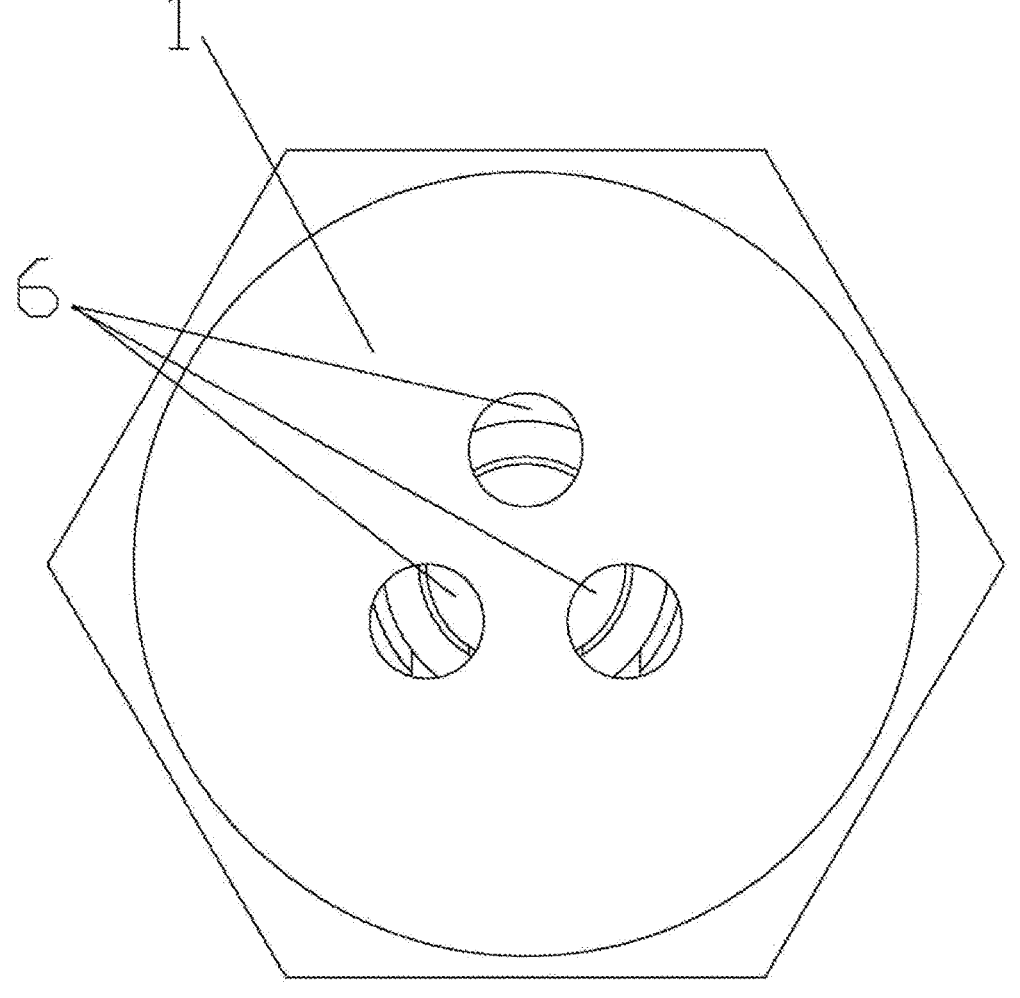
FIG. 4 is a structural schematic diagram of an end part of the other end of an explosion-proof pressure relief housing of the explosion-proof spiral pressure relief device for mine in accordance with an embodiment of the present disclosure.

An explosion-proof spiral exhaust pressure relief device for mine provided by this embodiment, as shown in FIG. 2 and FIG. 4, includes an explosion-proof pressure relief housing 1, and a first explosion-proof pressure relief inner core 2. An exhaust cavity is arranged inside the explosion-proof pressure relief housing 1 in an axial direction, the exhaust cavity is open at one end of the explosion-proof pressure relief housing 1, and the other end of the explosion-proof pressure relief housing 1 is provided with pressure relief holes 6 communicating with the exhaust cavity. The first explosion-proof pressure relief inner core 2 is arranged in the exhaust cavity. An outer wall of the first explosion-proof pressure relief inner core 2 is provided with two explosion-proof spiral pressure relief channels 4. One end, facing an inner bottom of the exhaust cavity, of the first explosion-proof pressure relief inner core 2 is provided with a first circumferential pressure relief groove 5. An outer wall of the end of the explosion-proof pressure relief housing 1 is provided with an external thread, and the external thread is configured to be connected to a flameproof cavity of a battery power supply.

In this specific embodiment, an end part and a side wall of the other end of the explosion-proof pressure relief housing 1 are both provided with pressure relief holes 6. A gap between an outer diameter of the explosion-proof spiral pressure relief channel 4 on the outer wall of the first explosion-proof pressure relief inner core 2 and an inner diameter of the exhaust cavity is 0.03 mm. In this embodiment, the gap between the outer diameter of the explosion-proof spiral pressure relief channel 4 on the outer wall of the first explosion-proof pressure relief inner core 2 and the inner diameter of the exhaust cavity is mainly configured for installing the first explosion-proof pressure relief inner core 2 in the explosion-proof pressure relief housing 1. A pitch of the two explosion-proof spiral pressure relief channels 4 on the outer wall of the first explosion-proof pressure relief inner core 2 is 10 mm. A cross-section area of each explosion-proof spiral pressure relief channel 4 is 0.8 mm². A length of each explosion-proof spiral pressure relief channel 4 is not less than 25 mm.

A high-pressure gas in a flameproof cavity enters from the open end of the exhaust cavity, flows to the inner bottom of the exhaust cavity through the explosion-proof spiral pressure relief channels 4, and is exhausted from the pressure relief holes 6 on the end part and the side wall of the other end of the explosion-proof pressure relief housing 1.

Embodiment II

This embodiment is an improved embodiment on the basis of Embodiment I, as shown in FIG. 1 to FIG. 4, in the present embodiment, one second explosion-proof pressure relief inner core 3 is also arranged between the explosion-proof pressure relief housing 1 and the first explosion-proof pressure relief inner core 2. The second explosion-proof pressure relief inner core 3 is of a rod-shaped structure, and an outer wall of the second explosion-proof pressure relief inner core 3 is provided with two explosion-proof spiral pressure relief channels 4. An accommodating cavity is arranged inside the second explosion-proof pressure relief inner core 3, and the accommodating cavity is configured for accommodating the first explosion-proof pressure relief inner core 2.

In this specific embodiment, one end, facing the inner bottom of the exhaust cavity, of the second explosion-proof pressure relief inner core 3 is provided with a second circumferential pressure relief groove 8, and the accommodating cavity communicates with the second circumferential pressure relief groove 8. A gap between the outer diameter of the spiral pressure relief channel 4 on the outer wall of the first explosion-proof pressure relief inner core 2 and an inner diameter of the accommodating cavity is 0.18 mm.

A high-pressure gas in the flameproof cavity enters from the open end of the exhaust cavity, flows to the inner bottom of the exhaust cavity through the explosion-proof spiral pressure relief channels 4 on the outer walls of the first explosion-proof pressure relief inner core 2 and the second explosion-proof pressure relief inner core 3 as well as the gap between each explosion-proof spiral pressure relief channel 4 and the inner wall of the exhaust cavity or the inner wall of the accommodating cavity, and then is discharged from the pressure relief holes 6 on the end part and the side wall of the other end of the explosion-proof pressure relief housing 1.

Embodiment III

Figure 5:
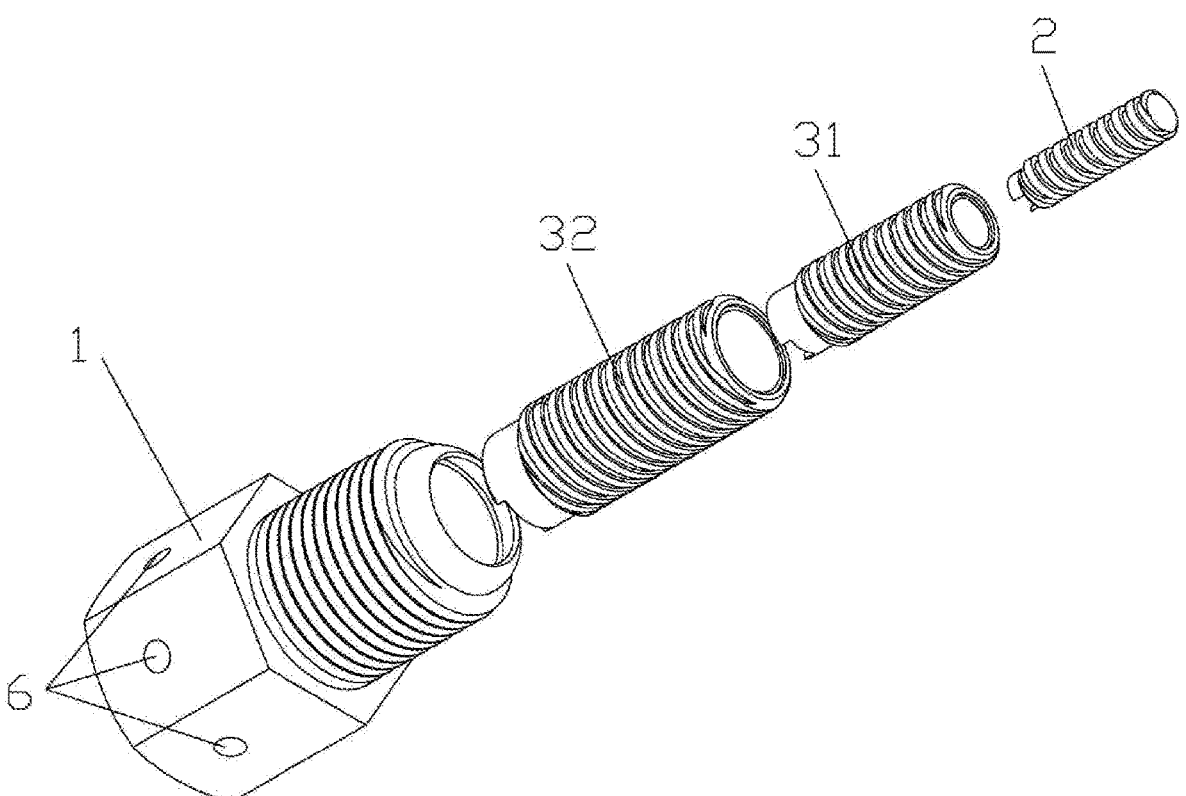
FIG. 5 is a schematic diagram of a three-dimensional structure of the explosion-proof spiral pressure relief device for mine provided with three stages of explosion-proof pressure relief inner cores in accordance with another embodiment of the present disclosure.
Figure 6:
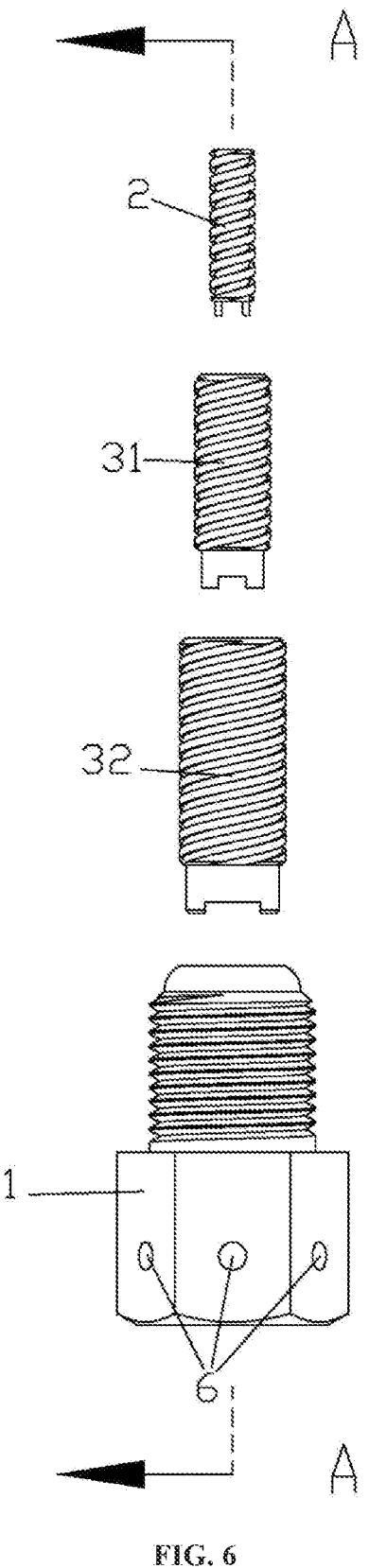
FIG. 6 is a structural schematic diagram of the explosion-proof spiral pressure relief device mine provided with three stages of the explosion-proof pressure relief inner cores in accordance with another embodiment of the present disclosure.
Figure 7:
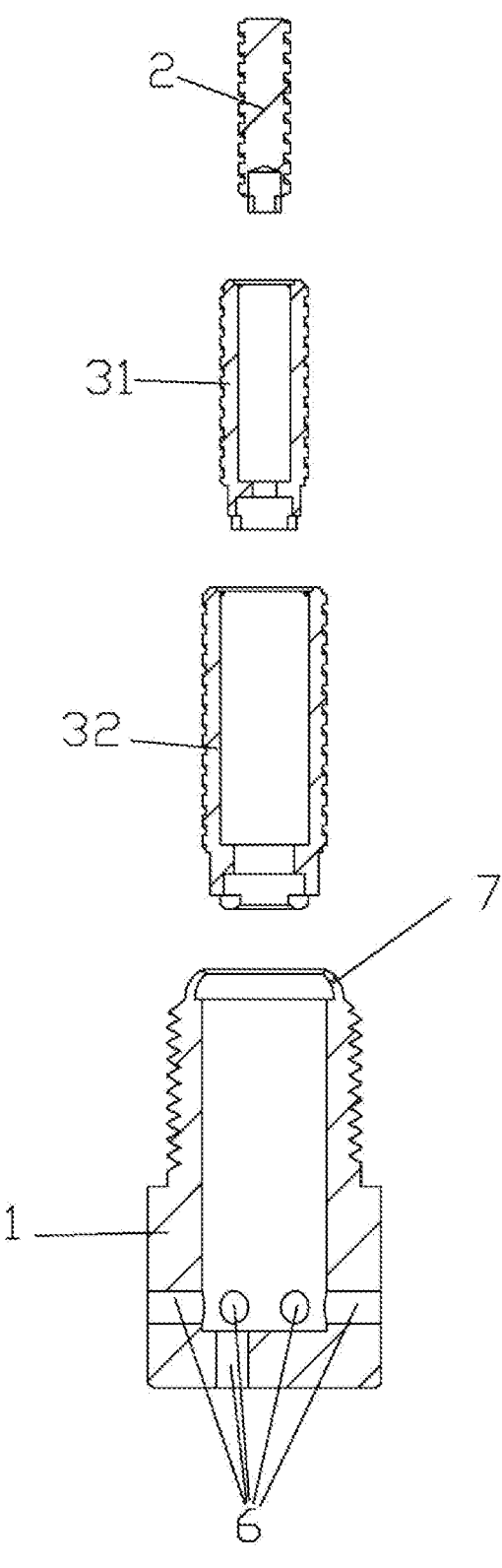
FIG. 7 is a schematic diagram of a sectional structure of the explosion-proof spiral pressure relief device for mine provided with three stages of the explosion-proof pressure relief inner cores in accordance with another embodiment of the present disclosure.

This embodiment is an improved embodiment on the basis of Embodiment II, as shown in FIG. 5 to FIG. 7, in the present embodiment, two second explosion-proof pressure relief inner cores 3 are arranged between the explosion-proof pressure relief housing 1 and the first explosion-proof pressure relief inner core 2, i.e., a first-stage second explosion-proof pressure relief inner core 31 and a second-stage second explosion-proof pressure relief inner core 32. A gap between an outer diameter of the explosion-proof spiral pressure relief channel 4 on the outer wall of the first-stage second explosion-proof pressure relief inner core 31 and an inner diameter of the accommodating cavity of the second-stage second explosion-proof pressure relief inner core 32 is 0.6 mm.

More specifically, one end of the explosion-proof pressure relief housing 1 is provided with a piping lock 7. After all the explosion-proof pressure relief inner cores are placed inside the exhaust cavity, the diameter of the open end of the exhaust cavity is reduced by the piping lock 7 to prevent the explosion-proof pressure relief inner cores from falling off.

It should be noted that, for those skilled in the art, apparently, the present disclosure is not limited to details of the exemplary embodiments, and may be implemented in other specific forms without departing from the spirit or basic characteristics of the present disclosure. Therefore, in any way, the embodiments should be regarded as exemplary, not limitative. And the scope of the present disclosure is limited by the appended claims, instead of the above description. Thus, all variations intended to fall into the meaning and scope of equivalent elements of the claims should be covered within the present disclosure. Any reference signs in the claims shall not be regarded as limitations to the concerned claims.

Specific examples are used for illustration of the principles and implementation methods of the present disclosure. The description of the embodiments is merely used to help understand the method and its inner core principles of the present disclosure. In addition, those skilled in the art can make various modifications in terms of specific embodiments and scope of application in accordance with the teachings of the present disclosure. In conclusion, the content of this specification shall not be construed as a limitation to the present disclosure.

What is claimed is:

1. An explosion-proof spiral exhaust pressure relief device for mine, comprising an explosion-proof pressure relief housing, and a first explosion-proof pressure relief inner core, wherein an exhaust cavity is arranged inside the explosion-proof pressure relief housing in an axial direction, the exhaust cavity is open at one end of the explosion-proof pressure relief housing, and another end of the explosion-proof pressure relief housing is provided with pressure relief holes communicating with the exhaust cavity;

the first explosion-proof pressure relief inner core is arranged in the exhaust cavity; and an outer wall of the first explosion-proof pressure relief inner core is provided with two first explosion-proof spiral pressure relief channels;

wherein at least one second explosion-proof pressure relief inner core is also arranged between the explosion proof pressure relief housing and the first explosion proof pressure relief inner core; each of the at least one second explosion-proof pressure relief inner core is of a rod-shaped structure, and an outer wall of each of the at least one second explosion-proof pressure relief inner core is provided with at least one second explosion proof spiral pressure relief channel; an accommodating cavity is arranged inside each of the at least one second explosion-proof pressure relief inner core;

wherein the at least one second explosion-proof pressure relief inner core comprises at least two second explosion-proof pressure relief inner cores, the accommodating cavity is configured for accommodating the first explosion-proof pressure relief inner core or a further one of the at least two second explosion-proof pressure relief inner cores; for every two adjacent second explosion-proof pressure relief inner cores of the at least two second explosion-proof pressure relief inner cores, a gap between an outer diameter of the at least one second explosion-proof spiral pressure relief channel on an outer wall of an inner one of the two adjacent second explosion-proof pressure relief inner cores and an inner diameter of an accommodating cavity of an outer one of the two adjacent second explosion-proof pressure relief inner cores is from 0.03 mm to 0.6 mm.

2. The explosion-proof spiral exhaust pressure relief device for mine according to claim 1, wherein one end, facing an inner bottom of the exhaust cavity, of the first explosion-proof pressure relief inner core is provided with a first circumferential pressure relief groove.

3. The explosion-proof spiral exhaust pressure relief device for mine according to claim 1, wherein one end, facing an inner bottom of the exhaust cavity, of each of the at least two second explosion-proof pressure relief inner core is provided with a second circumferential pressure relief groove, and the accommodating cavity communicates with the second circumferential pressure relief groove.

4. The explosion-proof spiral exhaust pressure relief device for mine according to claim 1, wherein a gap between an outer diameter of each of the two first explosion-proof spiral pressure relief channels on the outer wall of the first explosion-proof pressure relief inner core and an inner diameter of the accommodating cavity is from 0.03 mm to 0.6 mm.

5. The explosion-proof spiral exhaust pressure relief device for mine according to claim 1, wherein an end part and a side wall of the other end of the explosion-proof pressure relief housing are both provided with the pressure relief holes.

6. The explosion-proof spiral exhaust pressure relief device for mine according to claim 1, wherein an outer wall of the end of the explosion-proof pressure relief housing is provided with an external thread, and the external thread is configured to be connected to a flameproof cavity of a battery power supply.

7. The explosion-proof spiral exhaust pressure relief device for mine according to claim 1, wherein a length of each of the two first explosion-proof spiral pressure relief channels is not less than 25 mm.

* * * * *